H. L. KEITH.
MOTOR CONTROL SYSTEM.
APPLICATION FILED NOV. 24, 1919.
1,425,662.
Patented Aug. 15, 1922.
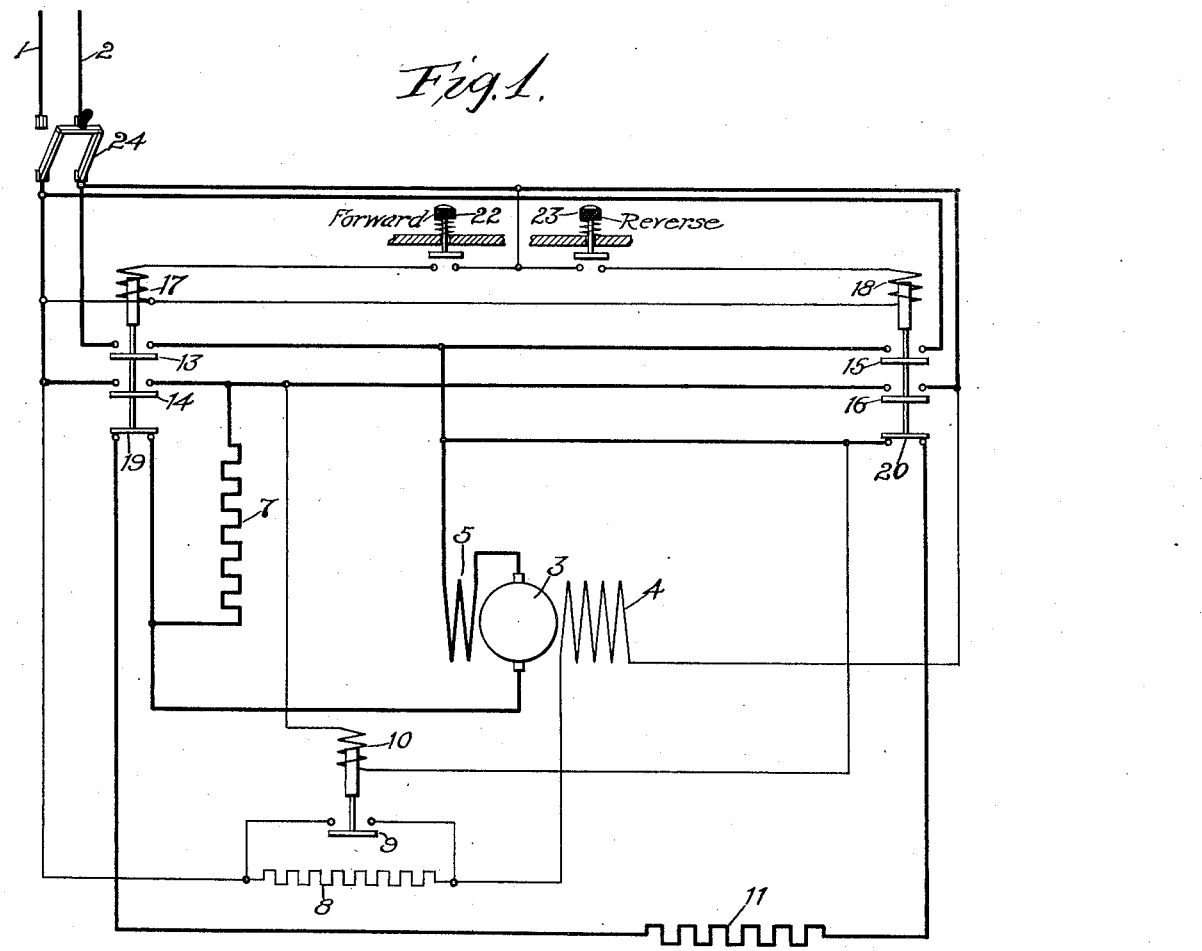
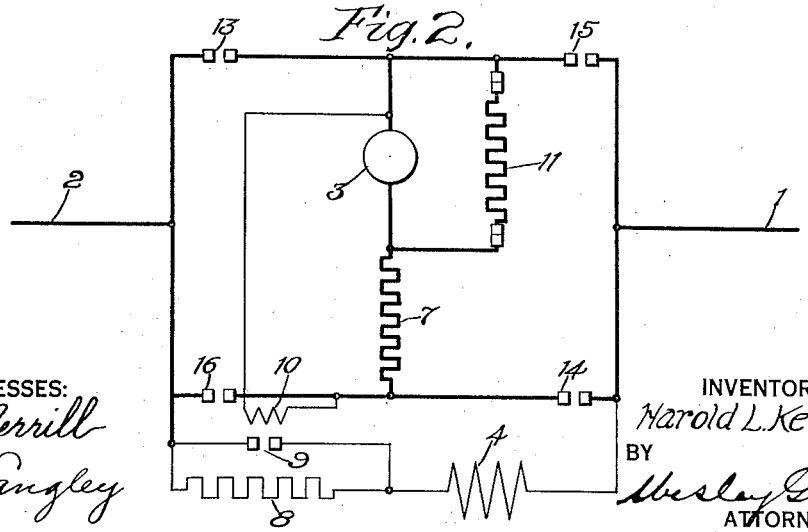
WITNESSES:
J. B. Merrill
J. R. Langley
INVENTOR
Harold L. Keith
BY
Wesley G. Carr
ATTORNEY

UNITED STATES PATENT OFFICE.

HAROLD L. KEITH, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,425,662. Specification of Letters Patent. Patented Aug. 15, 1922.

Application filed November 24, 1919. Serial No. 340,352.

*To all whom it may concern:*

Be it known that I, HAROLD L. KEITH, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to such systems as are employed in connection with the auxiliary motors of machine tools and similar machines.

My invention has for its object to provide a simple and automatic controlling means for insuring the normal field excitation of electric motors during their normal operation and during dynamic braking and for effecting economy of power when the motors are at rest.

In the operation of electric motors for such intermittent service as requires that they be accelerated and brought to rest within brief periods of time, it is necessary to provide automatic means for insuring that the field of a motor employed in such service shall be excited to the normal degree upon the closing of the motor circuit in order that an excessive rush of current shall not occur and that it may have a high torque for starting under load. It is desirable, also, that the same conditions in the motor field shall obtain during dynamic braking in order that the motor may be brought to rest as quickly as possible, consistent with safety to the motor.

If the field-magnet windings of an electric motor employed in intermittent service are fully energized during such periods as the motor is at rest, there is a comparatively large waste of energy. It is necessary, however, in certain cases, to excite the motor field to such degree, during the periods of rest, that the inductance of the windings and the reluctance of the magnetic circuits shall be partially overcome before the circuit is closed, in order to avoid the delay caused by building up the field from zero excitation.

According to the present invention, I employ a single switch for controlling a field resistor for an electric motor. The switch is provided with a single actuating coil which is connected in parallel relation to the motor armature and to the usual starting resistor, when the latter is in circuit with the armature. The switch closes substantially immediately upon the closing of the motor circuit. The switch opens when the counter-electromotive force of the motor armature is below a predetermined value, during dynamic braking.

The above described arrangement insures that the field resistor shall be shunted to provide the normal degree of field excitation when the current traversing the armature circuit exceeds a predetermined value. The field resistor is inserted in the field circuit to reduce the current traversing it when the motor is at rest or when the motor speed as measured by the difference in potential across a portion of the aramture circuit is below a predetermined rate during dynamic braking.

In the accompanying drawing, Fig. 1 is a diagrammatic view of circuits and apparatus embodying my invention; Fig. 2 is a schematic diagram of the system of Fig. 1.

Line conductors 1 and 2, which may be connected to any suitable source of energy, supply current to an electric motor, the armature of which is indicated at 3 and which is provided with a shunt field-magnet winding 4 and a series field-magnet winding 5. A resistor 7 is in the armature circuit of the motor during normal operation of the latter. If it is so desired, a portion or all of the resistor 7 may be shunted during the normal operation of the motor, but such arrangement is not material to the present invention.

A resistor 8, which is in circuit with the shunt field-magnet winding 4, is controlled by a switch 9 having an actuating coil 10 that is connected across a portion of the armature circuit including the motor armature and the starting resistor 7. A dynamic-braking resistor 11 is in circuit with the motor armature when the operating circuit of the motor is open at the usual reversing switches.

The armature circuits of the motor are controlled by two pairs of mechanically-connected reversing switches 13 and 14 and 15 and 16. The respective pairs of reversing switches are provided with actuating coils 17 and 18. A dynamic-braking circuit for the motor is completed by switches 19 and 20 that are mechanically interlocked to the respective pairs of reversing switches.

Since the actuating coil 10 of the switch 9 is connected across the motor armature and the starting resistor 7, it is subject to substantially line voltage during normal operation of the motor. The coil 10 is energized in accordance with the counter electromotive force of the motor during dynamic braking. The reversing switches are respectively controlled by push-button switches 22 and 23 that are respectively designated by legends "Forward" and "Reverse" to indicate the corresponding directions of the device actuated by the motor.

It may be assumed that the various switches are in their respective illustrated positions. Line switch 24 is closed to connect the system to a source of energy. It may be assumed that the push-button switch 22 is actuated to effect the operation of the motor in the corresponding direction. A circuit, which is completed thereby, extends from line conductor 1 through coil 17 and push-button switch 22 to line conductor 2. The coil 17 is energized to close switches 13 and 14. The armature circuit of the motor, which is completed thereby, extends from line conductor 1, through switch 14, resistor 7, armature 3, series field-magnet winding 7 and switch 13, to line conductor 2.

The coil 10 is energized to close switch 9 and thereby complete a shunt circuit for the field resistor 8. The motor is thus provided with a strong field during the period of starting. This shunt circuit is maintained so long as the push-button switch 22 is held in its closed position, thereby insuring maximum torque for the motor during its normal operation.

To bring the motor to rest, the push-button switch 22 is released to open the circuit of the coil 17. The corresponding switches are opened and the switch 19 completes a dynamic-braking circuit for the motor which extends from the armature 3 through switch 19, resistor 11, switch 20 and series field-magnet winding 5 to the motor armature 3. Since the motor is operating at a relatively high speed, a heavy rush of current immediately traverses the dynamic-braking circuit causing a relatively high difference in potential between the terminals of the coil 10. The switch 9 remains closed to maintain the shunt circuit for the resistor 8 and a normal degree of field excitation for the motor during dynamic-braking is thereby insured.

When the current traversing the dynamic-braking circuit and the difference in potential across the terminals of the coil 10 fall to such values that the latter is energized below a predetermined degree, the switch 9 opens to again insert the resistor 8 in circuit with the shunt field-magnet winding 4. In practice, the switch 9 does not open until the motor armature is substantially at rest.

The operation of the motor in the opposite direction is effected by depressing the push-button switch 23. The operation is similar in every respect to that described above in connection with the operation of the motor in the forward direction except that the reversing switches 15 and 16 are closed to reverse the connections of the armature 3. A detailed description of this portion of the operation of the system is, accordingly, omitted as unnecessary to a full understanding of my invention.

It will be noted that I provide an arrangement whereby a single switch having a single actuating coil is effective to insure full field excitation of the motor upon the completion of its armature circuit, either for normal operation or for dynamic braking. The reduction of the current traversing the shunt field-magnet winding occurs automatically upon the dynamic braking of the motor to the predetermined minimum speed. The controlling mechanism is simple in arrangement and automatic in operation, thus rendering its action certain in all cases.

I claim as my invention:

1. In a motor-control system, the combination with an electric motor and a field resistor therefor, of a single switch having a single actuating coil in shunt relation to the armature of said motor for controlling said resistor during the normal operation and during the dynamic braking of said motor.

2. In a motor-control system, the combination with an electric motor and a field resistor therefor, of means selectively governed in accordance with voltages of constant and of varying values for controlling said resistor.

3. In a motor-control system, the combination with an electric motor and a field resistor therefor, of means for controlling said resistor, said means comprising a switch having a single actuating coil in shunt relation to the armature of said motor that is selectively energized in accordance with the values of constant and of varying voltages.

4. In a motor-control system, the combination with an electric motor and a starting resistor and a field resistor therefor, of a switch having an actuating coil connected across the armature of said motor and said starting resistor for controlling said field resistor.

5. In a motor-control system, the combination with an electric motor and a starting resistor and a field resistor therefor, of means governed in accordance with the values of line voltage or of the counter-electromotive force of the motor for respectively controlling said field resistor during normal operation and during dynamic braking of said motor.

6. In a motor-control system, the combination with an electric motor and a starting resistor and a field resistor therefor, of means governed in accordance with the value of the difference in potential across a portion of the armature circuit of the motor including the motor armature and the starting resistor for controlling said field resistor.

7. In a motor-control system, the combination with an electric motor and a starting resistor and a field resistor therefor, of means governed in accordance with the value of the difference in potential across a portion of the armature circuit of the motor for controlling said field resistor during the normal operation and during the dynamic braking of said motor.

8. In a motor-control system, the combination with an electric motor and a field resistor therefor, of a single switch having a single actuating coil in shunt relation to the armature of said motor for insuring the shunting of said resistor during acceleration and deceleration of said motor.

In testimony whereof, I have hereunto subscribed my name this 18th day of November, 1919.

HAROLD L. KEITH.